April 20, 1971  W. C. SIMPSON  3,575,842

RECOVERING TAR FROM TAR SAND

Filed July 23, 1968

INVENTOR:
WARREN C. SIMPSON
BY: Glen Grunewald
HIS ATTORNEY 3,575,842
RECOVERING TAR FROM TAR SAND
Warren C. Simpson, Berkeley, Calif., assignor to
   Shell Oil Company, New York, N.Y.
Filed July 23, 1968, Ser. No. 746,791
Int. Cl. C10g 1/04
U.S. Cl. 208—11                                    6 Claims

ABSTRACT OF THE DISCLOSURE

Removing tar from tar sand by a continuous process which includes pneumatically passing a slurry of tar sand and solvent for the tar through a pipe as a series of slugs separated by slugs of a gas, withdrawing liquid from each slug of slurry as it passes through a series of filtration zones and introducing liquid into each slug of slurry as it passes through a series of washing zones, and recovering tar from the recovered liquid. Also disclosed is the tubular continuous extraction device which includes a tubular element having a series of alternate filtering and washing zones with means to regulate the pressure in the filtering zones to be successively diminishing in the direction of flow.

BACKGROUND

Figure 1:
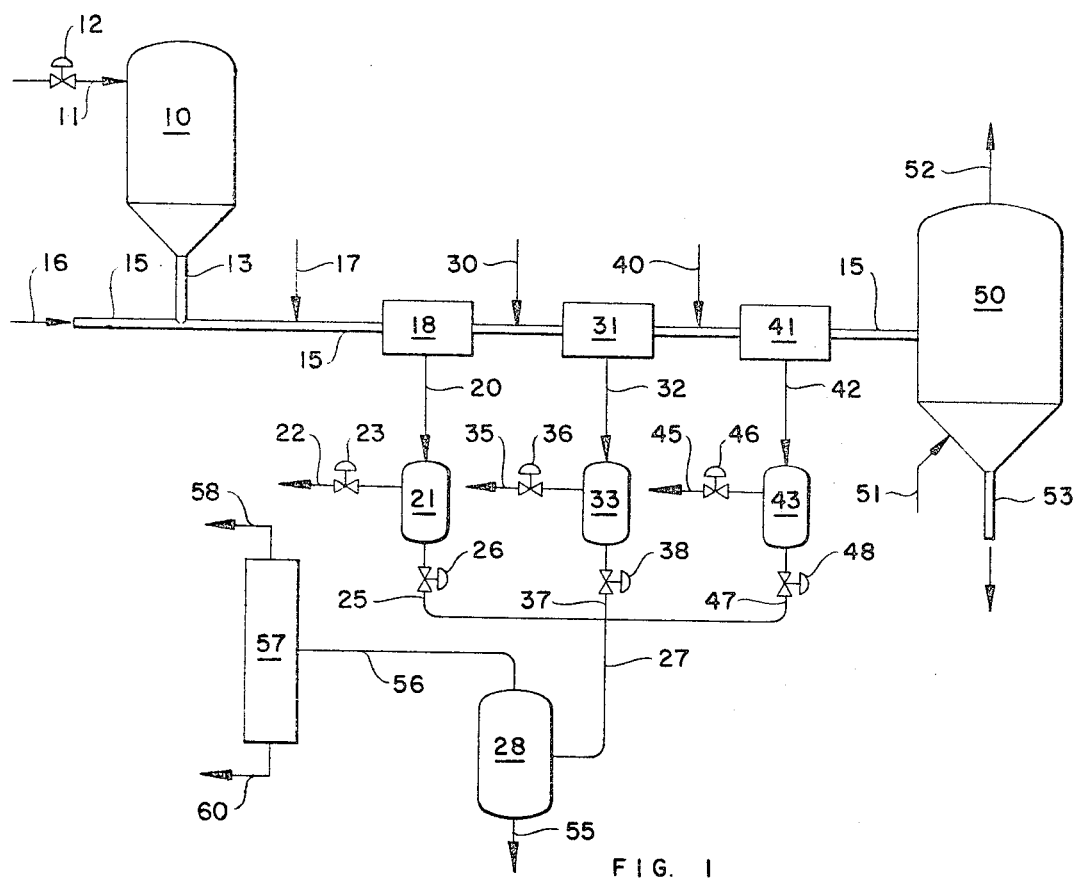

As liquid crude oil sources become less available, less direct sources of petroleum become increasingly attractive. One such source of petroleum is tar sand. Tar sand, as the name indicates, consists of sand particles that are coated with tar. This material naturally occurs as deposits that can be mined. Although tar sands represent a good source of petroleum, it is necessary to separate the tar from the sand by a means that is economically competitive with other sources of petroleum such as liquid crude to make its use profitable.

Many approaches to recovering tar from tar sand have been employed. The approaches include solvent extraction, water displacement of the tar, thermal cracking or distillation of the tar, to mention a few. Of these, solvent extraction is attractive because tar recovery is good, but in order to be commercially useful it is necessary that solvent recovery be almost complete because the solvent employed is worth so much more than the tar that is recovered. This problem is also magnified because the sand represents so much of the material that is worked on that even very small percentage losses of solvent in the discarded sand cannot be tolerated. Solvent extraction of tar from tar sand involuves mixing the tar sand with a solvent for tar to produce a slurry of a liquid phase of solvent and dissolved tar and a solid phase of sand, and then separating the liquid phase from the solid phase and subsequently recovering the tar from the solvent.

A very direct method to separate the solvent and tar liquid phase from the sand is by filtration. However, in petroleum processing such enormous volumes of material are handled that the usual filtering methods are unattractive. The use of batch type filter presses could not economically provide enough filtering capacity for the thousands of barrels of material to be treated, and large continuous filters of the rotating drum type or of the moving belt type are so costly to build, to operate and to maintain for large flow streams that they cannot economically be employed to produce a product that must compete with a low-cost material such as liquid crude oil.

THE INVENTION

This invention deals with a solvent extraction method and apparatus in which a slurry of solvent and a particulate solid phase containing a soluble component is first created and then continuously separated by filtration while that slurry passes through a pipe. The continuous filtering process of this invention is created by breaking the stream of slurry to be filtered into a series of slugs of slurry separated from each other by slugs of gas. The slugs of gas permit each slug of slurry to be independently treated and to a lesser extent expand and contract to take up small volume changes in the slugs of slurry when liquid is removed from them or added to them in a sequence of filtering and washing steps. In this manner solvent extraction occurs in a sequence of filtration and washing steps that can take place within a slug of slurry as it flows through a pipe, and each filtration and washing step is isolated in that particular slug and does not affect any other slug of slurry that is having its own processing steps taking place within it. Other steps such as dilution or solvent displacement steps can also take place within each slug.

The process of this invention will be described with reference to recovering tar from tar sand although it has more general applications. The process is initiated by creating a slug of slurry comprising tar sand and a solvent for the tar passing through a pipe. The slug can be created by introducing a slug of performed slurry into the pipe, which is the preferred embodiment of this invention, or by creating a slug of an expanded bed of tar sand particles to which solvent is added as it passes through the pipe. Regardless of how it is formed, as each slug of slurry passes through the pipe, it passes through a series of filtering and washing zones which act alternately to separate tar and the solvent from the sand and to dilute the slug of slurry with a suitable fluid. Each filtering zone is in the form of a fluid permeable portion in the pipe that is connected to a closed pressurized vessel. Each filtering zone may be a screen covering an open portion of the slug-carrying pipe surrounded by a jacket, or it may be a laterally attached tube containing a bed of particles through which fluid can pass. Each filter portion discharges into a closed vessel that is maintained at a regulated pressure, and each successive filtering zone is at a lower pressure than the preceding one.

Each washing zone in the process of this invention is characterized by being between two filtering zones and it is adapted so that fluid may be added to each slug as it passes toward the next filtering zone. As each slug passes through the pipe, it is subjected to a series of filtering and washing steps; and at least the final step is a water displacement step wherein either steam or water is injected into a slug to remove as much solvent and tar from the sand as possible.

The slugs of gas between the slugs of slurry take up the volume changes, if any, and maintain the integrity of each slug as it flows from one zone to the next. It is evident that the process of this invention does not require a large amount of manual labor nor does it require large devices with moving parts, and it is also evident that the process of this invention is capable of handling large volumes of liquid and large volumes of solid in a relatively small, compact, and simple device.

This invention also includes a novel apparatus for solvent extraction of soluble material from a solid material. The apparatus of this invention includes a tubular element provided at the inlet with means to feed solids and gas as alternate slugs. The solids feed may be in the form of an expanded bed of dry particles or in the form of a slurry. Known means are available for introducing such a feed into a pipe as a series of slugs. The apparatus of this invention has along its length a plurality of alternate fluid introduction points and fluid withdrawal points and the fluid withdrawal points are connected to means for regulating the pressure at each to be lower than the pressure at the preceding liquid withdrawal point. The apparatus also is provided with vessels for collecting withdrawn liquid, and it is usually provided with means for separating the solvent from the extracted material although the latter is not required where the solvent and the extracted material are to be used as a mixture.

To illustrate better the process and apparatus of this invention, the accompanying drawings are provided. The drawings illustrate typical embodiments of the invention and are intended to be illustrative rather than limiting on its scope.

Figure 2:
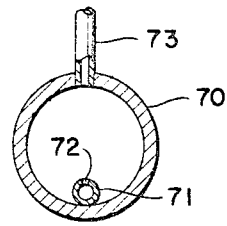
Figure 3:
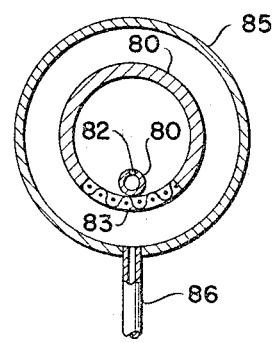
Figure 4:
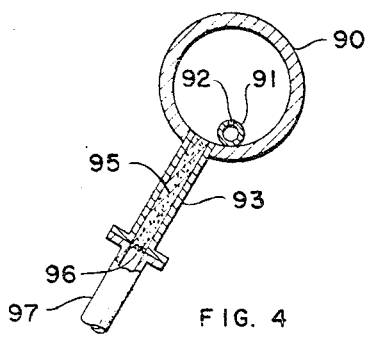

FIG. 1 is a schematic flow diagram illustrating one process embodying this invention; FIG. 2 is an elevational view in section through a washing or fluid injection zone; FIG. 3 is an elevation view in section through one suitable filtering or fluid removing zone; and FIG. 4 is an elevation view in section of another suitable filtering zone.

For simplicity, the process will be described with reference to removing tar from tar sand. Referring to FIG. 1, a vessel 10 is provided to contain the tar sand, either as a bed of dry particles or as a slurry, that is to be treated in accordance with this process. The vessel 10 preferably contains a slurry of tar sand in a solvent for the tar, such as toluene, and it is provided with a line 11 having pressure control valve 12 for maintaining a pressure within the vessel 10. Known means, which are not shown, are provided for loading vessel 10.

The material in vessel 10 discharges through line 13 into the tubular filter element 15 which is provided also with a gas inlet illustrated at 16. By suitably regulating the pressure in the vessel 10 and the gas flow rate at introduction point 16, the pressure at the point where line 13 enters line 15 alternately builds up and relieves itself to provide flow through line 15 in the form of a series of slugs of slurry separated from one another by a series of slugs of gas.

FIG. 1 illustrates a line 17 for providing additional solvent to the stream flowing through line 15. Line 17 is necessary if the feed through line 15 is an expanded bed of dry particles rather than a slurry, but the line 17 may be desirable to supply additional solvent to a slurry that has insufficient solvent to dissolve all the tar on the sand. At any rate, the material passing through line 15 and into filtration zone 18 is in the form of a slurry having a liquid phase of solvent, such as toluene, in which the tar is substantially completely dissolved, and a solid phase which is the sand particles from which the tar has been dissolved.

The filtration zone 18 is provided with a fluid-permeable portion through which the liquid phase in each slug may be removed and passed through line 20 into vessel 21. Vessel 21 is shown with line 22 and pressure control valve 23, which are provided so that a controlled pressure may be maintained in vessel 21, and accordingly at the point where liquid is removed from the line 15 through the permeable portion in filtration zone 18. Line 25 discharges liquid phase from vessel 21 through a level control valve 26, and the liquid phase passes through line 27 into a collection vessel 28.

The slug of slurry emerging from zone 18 passes toward filtration zone 31. In passing toward zone 31, it has an additional volume of solvent introduced through line 30. It has been found that line 30 may inject solvent continuously into tubular element 15 and that solvent injected into a slug of gas simply lies on the bottom of the element 15 and accumulates until a slug of slurry comes by, and thereafter the injected solvent is picked up by the slug of slurry. The added solvent dilutes the solvent-tar solution remaining in the slug of slurry and the diluted slug passes into filtration zone 31 wherein a volume of liquid is removed through a permeable element and is passed through line 32 into vessel 33. Vessel 33 is provided with a pressure control means illustrated here as a vent line 35 and pressure control valve 36, and the vessel 33 is controlled so that it is at a lower pressure than the vessel 21 thereby maintaining the fluid permeable exit from line 15 within the filtration zone 31 at a lower pressure than the corresponding portion in filtration zone 18. The pressure differential between filtration zone 18 and filtration zone 31 strongly influences the rate at which slugs of slurry traverse tubular element 15. Level control valve 38 discharges liquid phase from vessel 33 into the before-mentioned line 27.

The slug of slurry leaving filtration zone 31 passes another fluid injection point 40 wherein liquid phase is again introduced. The fluid injection point 40 may be adapted to add steam or water to the slug of slurry so that substantially all of the solvent-tar liquid phase in the slug is displaced and passes from filtration zone 41 through line 42 into vessel 43. Again, vessel 43 is pressure controlled through line 45 and valve 46 to be maintained at a lower pressure than vessel 33, and thereby a lower pressure in filtration zone 41 exists than there is in filtration zone 31. Level control valve 48 passes liquid phase in vessel 43 through line 47 into line 27 so that the entire amount of liquid phase extracted from slurry slugs in line 15 is ultimately accumulated in the vessel 28.

The slurry leaving line 41 passes finally into a stripping vessel 50 wherein steam is introduced through line 51 to strip final traces of solvent from the solid particles of sand which are called tailings. A mixed stream of steam and solvent vapors pass through line 52 for condensation and phase separation in accordance with known procedures and the tailings fraction passes through line 53 to be disposed of in accordance with known procedures.

The liquid phase in vessel 28 is separated into an aqueous phase and a hydrocarbon phase. The aqueous phase is discharged through line 55 to be disposed of or recycled. The hydrocarbon phase is passed through line 56 into a fractional distillation column 57 wherein the tar product is separated from solvent and recovered through line 60. The solvent passes through line 58 and is condensed and returned to the extraction system. The product recovered through line 60 is a crude petroleum material suitable for refining in accordance with known procedures.

FIG. 2 illustrates a typical cross-section of a fluid injection zone in the tubular filtering device described in relation to FIG. 1. The outer conduit shown in FIG. 1 as 15 is illustrated as 70. The tubular element 70 may or may not be provided with a small inner conduit 71 having linearly spaced perforations 72. The small inner conduit is also supplied with a gas at a very slightly higher pressure than the main gas stream within conduit 70 so that a small bleed of gas through the perforations 72 takes place. Particularly when the tar sand is introduced without a liquid phase, the presence of conduit 71 and the gas passing through perforations 72 are beneficial to maintain the slug of solid particles as a flowable entity. However, the presence of a conduit such as 71 may be beneficial even when slugs of slurry pass through tubular extractor 70 because it helps maintain a fairly even pressure drop across the entire system. The conduit 73 is provided to inject fluid into conduit 70, either regularly or intermittently, and preferably at a regular controlled rate.

FIG. 3 illustrates a typical embodiment of a filtration zone or a fluid extraction zone, such as the ones illustrated at 18, 31, and 41 in FIG. 1. A portion of the conduit 80 within each filter zone is made of a screen 83 shown here in section. The screen is permeable to the fluid in the pipe 80 but it prevents solid sand particles from passing into the annular shaped chamber formed around the conduit 80 by the jacket 85. Liquid collected in the annular space discharges through line 86 into a collection vessel, typically the vessel 21 illustrated in FIG. 1. Again, the perforated inner line 81 having perforations 82 therein is illustrated passing through the filtration zone as well as other portions of the conduit 80 to aid in the flow of material as described hereinabove.

In the operation of the device of this invention it has been found that screens such as screen 83 tend to clean themselves of embedded fine particles. Apparently, the alternate slugs of slurry and gas that pass over the screen 83 produce a slight pulsating pressure within the annular space between the conduit 80 and the jacket 85 so that when the slug of slurry progresses past the screen 83 there is a slight reverse in the flow of gas phase through the screen 83 that dislodges fine particles that would normally accumulate there. The slug of slurry passing axially through the conduit 80 also has a scrubbing effect on the screen 83 which tends to dislodge and carry particles of solids from the screen and into the next section of solid pipe.

FIG. 4 illustrates another filtration zone suitable for use in this invention. The tubular element 15 of FIG. 1 is illustrated in FIG. 4 at 90, and, as in the other illustrated embodiments, there is present the optional small tube 91 within element 90 that supplies gas through perforations 92. The filtering action in the embodiment illustrated in FIG. 4 is accomplished by withdrawing liquid from element 90 through pipe 93 which is filled with a liquid permeable bed of granular material indicated at 95. Some suitable means, such as screen 96 held between flanges is provided to maintain bed 95 in place. Pipe 97 connects to a pressurized collection vessel such as vessel 21 shown in FIG. 1. Although FIG. 4 illustrates one discharge pipe provided to the filtration zone, more than one such pipe may be used, and various pipes may be placed at different parts of the periphery of element 90, for example discharging from the top in zones where steam displacement of a hydrocarbon is accomplished.

As an example of the process of this invention, a pilot tar sand extraction unit was prepared, the main element of which was a one-half inch diameter glass pipe having an 0.0625 inch diameter perforated stainless steel tubing lying on the interior bottom portion thereof. The glass pipe was fitted with a T section provided on the run with a source of compressed air, and on the side with a source of slurry to be described hereinafter.

The glass pipe had three filter sections each constructed the same. Each filter section consisted of an opening in the bottom of the pipe covered with a 200 mesh screen, the openings being 12 inches long and 3/16 inch across. The openings were within a jacket surrounding the pipe. The glass pipe discharged into a drying vessel.

A pressurized hopper was charged with a mixture of ground tar sand and toluene which produced a slurry containing 0.36 ml. of toluene per gram of tar sand. The feed hopper was pressurized with compressed air glass pipe which produced a flow rate of 1.3 standard cubic to 5 p.s.i.g. and air flow at 5 p.s.i.g. was started through the feet per minute. The process was performed both with and without the perforated small tube; and when it was used, a small unmeasured positive flow of air was maintained through the perforated tubing lying within the half-inch pipe. When the feed hopper was opened, it fed slurry into the half-inch pipe in a pulsating flow to produce slugs of slurry flowing through the pipe. After flowing through the first filtration zone, an additional 0.24 ml. of toluene was added per gram of tar sand and after flowing through the second filtration zone 0.24 gram of steam was introduced per gram of tar sand. After the third and final filtration the tailings were discharged into the drying vessel wherein the final traces of water and solvent were removed to produce dry sand. The collection vessel of the first, second, and third filtration zones were maintained respectively at 4 p.s.i.g., 3 p.s.i.g., and 2 p.s.i.g. to maintain smooth flow.

The collected material removed from the three filtration zones was separated into an aqueous and a nonaqueous phase, and the non-aqueous phase was separated into a tar fraction and a toluene fraction. Analysis of the dried tailings showed that the process resulted in 92.2% of the tar being extracted from the tar sand.

Although the process has been described with reference to extracting tar from tar sand with toluene, it is evident that the process of this invention is suitable for other extractions of soluble material from solid particles. It is not intended to limit the invention to any specific solvent, solute, or solid particle material. The process of this invention is more generally useful than described in the foregoing example. It is also evident that any number of filtering and washing zones may be employed with the same or different solvents, the specific number and character of such zones being selected with regard to the character of the process, materials, and economics involved. For example, a final washing zone employing an inexpensive solvent different from the main solvent may be employed to displace a more expensive main solvent, or a more volatile solvent may be employed in a final washing zone to facilitate stripping of residual solvent from the solid particles from which a product has been extracted.

I claim as my invention:

1. A process for extracting a soluble component from a particulate solid material containing said soluble component, which comprises:
   (a) preparing a slurry of solid material in a solvent for the soluble component contained therein;
   (b) passing the slurry as a series of slugs separated by slugs of gas through a conduit;
   (c) withdrawing liquid from said slugs at a plurality of points along the conduit;
   (d) introducing liquid into the slugs at a plurality of points intermediate the withdrawal points;
   (e) collecting the withdrawn liquid containing the soluble component dissolved therein.

2. A process for separating tar from tar sand comprising:
   (a) preparing a slurry of tar sand in a solvent for tar;
   (b) passing the slurry as a series of slugs separated by slugs of gas phase through a conduit;
   (c) withdrawing liquid from the slugs of slurry at a plurality of points along said conduit;
   (d) introducing fluid into said slugs at a plurality of points intermediate the withdrawal points;
   (e) collecting withdrawn liquid and recovering the tar from the solvent.

3. The process of claim 2 wherein solvent for tar is introduced at the first of said introduction points and steam is introduced at the last of said introduction points.

4. The process of claim 2 wherein the gas phase is an inert gas.

5. The process of claim 2 wherein the withdrawal points are at progressively diminishing pressure.

6. A device for extracting a soluble component from a particulate solid material containing said soluble component, comprising:
   (a) means for introducing slurry of solid in solvent for the soluble component into a conduit as a series of slugs separated by slugs of gas phase;
   (b) a plurality of liquid permeable zones in said conduit, each liquid permeable zone connected to a closed vessel;
   (c) a fluid injection point between the initial and final liquid permeable zones;
   (d) means to regulate the pressure in each closed vessel so that successive liquid permeable zones are at successively lower pressures.

References Cited

UNITED STATES PATENTS

| | | | |
|---|---|---|---|
| 2,965,557 | 12/1960 | Price | 208—11 |
| 3,131,141 | 4/1964 | West | 208—11 |
| 3,422,000 | 1/1969 | Bichard | 208—11 |

CURTIS R. DAVIS, Primary Examiner